US011823171B1

(12) United States Patent
Ketharaju

(10) Patent No.: US 11,823,171 B1
(45) Date of Patent: Nov. 21, 2023

(54) PAYMENT FUNCTION SERVICE

(71) Applicant: Wells Fargo Bank, N.A., San Francisco, CA (US)

(72) Inventor: Rameshchandra Bhaskar Ketharaju, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/645,642

(22) Filed: Dec. 22, 2021

(51) Int. Cl.
*G06Q 20/32* (2012.01)
*G06Q 20/06* (2012.01)
*G06Q 20/38* (2012.01)

(52) U.S. Cl.
CPC ....... *G06Q 20/3267* (2020.05); *G06Q 20/065* (2013.01); *G06Q 20/38215* (2013.01)

(58) Field of Classification Search
CPC ............ G06Q 20/3267; G06Q 20/065; G06Q 20/38215
USPC .......................................................... 705/39
See application file for complete search history.

(56) References Cited

U.S. PATENT DOCUMENTS 9,805,365 B2 10/2017 Chen et al.
10,127,539 B2 11/2018 Castinado et al.
10,740,760 B2 8/2020 Sundaram P
2016/0196557 A1* 7/2016 Davis ................... G06Q 20/405 705/40
2016/0253660 A1* 9/2016 D'Alisa ............ G06Q 20/3674 705/67
2016/0253669 A1 9/2016 Yoon et al.
2017/0262842 A1* 9/2017 Subbarayan ..... G06Q 20/38215
2018/0174137 A1* 6/2018 Subbarayan ......... G06Q 20/409
2019/0213596 A1* 7/2019 Kallugudde ........... G06Q 20/40
2021/0065143 A1* 3/2021 Batra .................. G06Q 20/027
2021/0065179 A1* 3/2021 Batra .................. G06Q 20/027
2021/0073813 A1* 3/2021 Nolte ................. G06Q 20/3829
2022/0044234 A1* 2/2022 Nichani ........... G06Q 20/38215
2022/0108287 A1* 4/2022 Gupta .................. G06Q 20/227

FOREIGN PATENT DOCUMENTS

WO WO-2012158506 A1 * 11/2012 .......... G06Q 20/322

OTHER PUBLICATIONS

"Near Field Communication and Bluetooth Bridge System for Mobile Commerce," by C. Y. Leong; K. C. Ong; K. K. Tan; and O. P. Gan. 2006 4th IEEE International Conference on Industrial Informatics. IEEE, 2006. p. 50-55. (Year: 2006).*

(Continued)

*Primary Examiner* — Sara C Hamilton
(74) *Attorney, Agent, or Firm* — Shumaker & Sieffert, P.A.

(57) ABSTRACT

A computing device having a payment function service may receive, from an external computing device associated with a first user, a request to transact a payment between the first user and a second user. The computing device may negotiate with a first plurality of payment function services of a parent payment gateway associated with the first user and with a second plurality of payment function services of a receiving payment gateway associated with the second user to transact the payment between a second payment function service of the parent payment gateway and a third payment function service of the receiving payment gateway, and may communicate with the second payment function service and the third payment function service to process the payment.

17 Claims, 5 Drawing Sheets

(56) References Cited

OTHER PUBLICATIONS

"Secure Payments and the Internet of Things", Retreived from https://www.visa.co.uk/dam/VCOM/global/visa-everywhere/documents/visa-secure-payments-and-internet-of-things-whitepaper.pdf., 2019, 11 pages.

"IoT and Payments: Current Market Landscape", Retrieved from https://www.securetechalliance.org/wp-content/uploads/IoT-Payments-WP-Final-Nov. 2017.pdf, Nov. 2017, 26 pages.

* cited by examiner

PAYMENT FUNCTION SERVICE

TECHNICAL FIELD

The invention relates to techniques for providing a secure payment function service.

BACKGROUND

Function as a service is a category of cloud computing services that provides a platform for developing, running, and managing application functionalities without the complexity of building and maintaining the infrastructure typically associated with developing and launching an application. Function as a service may enable serverless execution of modular pieces of code on the edge of a network.

SUMMARY

In general, this disclosure describes techniques for secure payment transactions using payment function as a service that executes at the edges of a network. A network may include edge nodes having payment function services that provide payment function as a service (PFaaS) for computing devices that communicate with the edge nodes. A first user may send a payment to a second user by using a computing device to directly connect with a payment function service at a node of the network to send a request to transact the payment to the second user. The payment function services may receive the request to transact the payment and may directly negotiate and communicate with payment function services of payment gateways on the edges of the network in order to transact the payment.

The techniques described herein may provide one or more technical advantages. For example, by enabling computing devices to directly communicate with payment function services at the edge of a network, the techniques described herein may increase the security of transacting payments by not having the computing device communicate with a payment function service via any intermediary or third-party interfaces. Further, the techniques described herein may increase the speed and security at which payment function services may transact payments by enabling payment function services to directly communicate with each other over a network, thereby reducing the need for payment function services to communicate with intermediaries or other third parties in order to communicate with each other.

In one aspect, a method includes receiving, by a node of a network and from a computing device associated with a first user, a request to transact a payment between the first user and a second user; negotiating, by the payment function service, with a first plurality of payment function services of a parent payment gateway associated with the first user and with a second plurality of payment function services of a receiving payment gateway associated with the second user to transact the payment between a second payment function service of the parent payment gateway and a third payment function service of the receiving payment gateway; and communicating, by the payment function service, with the second payment function service and the third payment function service to process the payment.

In another aspect, a computing device includes memory. The computing device further includes one or more processors in communication with the memory and configured to: receive, from an external computing device associated with a first user, a request to transact a payment between the first user and a second user; negotiate with a first plurality of payment function services of a parent payment gateway associated with the first user and with a second plurality of payment function services of a receiving payment gateway associated with the second user to transact the payment between a second payment function service of the parent payment gateway and a third payment function service of the receiving payment gateway; and communicate with the second payment function service and the third payment function service to process the payment.

In another aspect, a non-transitory computer-readable storage medium storing instructions that, when executed, cause one or more processors of a computing device to: receive, from an external computing device associated with a first user, a request to transact a payment between the first user and a second user; negotiate with a first plurality of payment function services of a parent payment gateway associated with the first user and with a second plurality of payment function services of a receiving payment gateway associated with the second user to transact the payment between a second payment function service of the parent payment gateway and a third payment function service of the receiving payment gateway; and communicate with the second payment function service and the third payment function service to process the payment.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
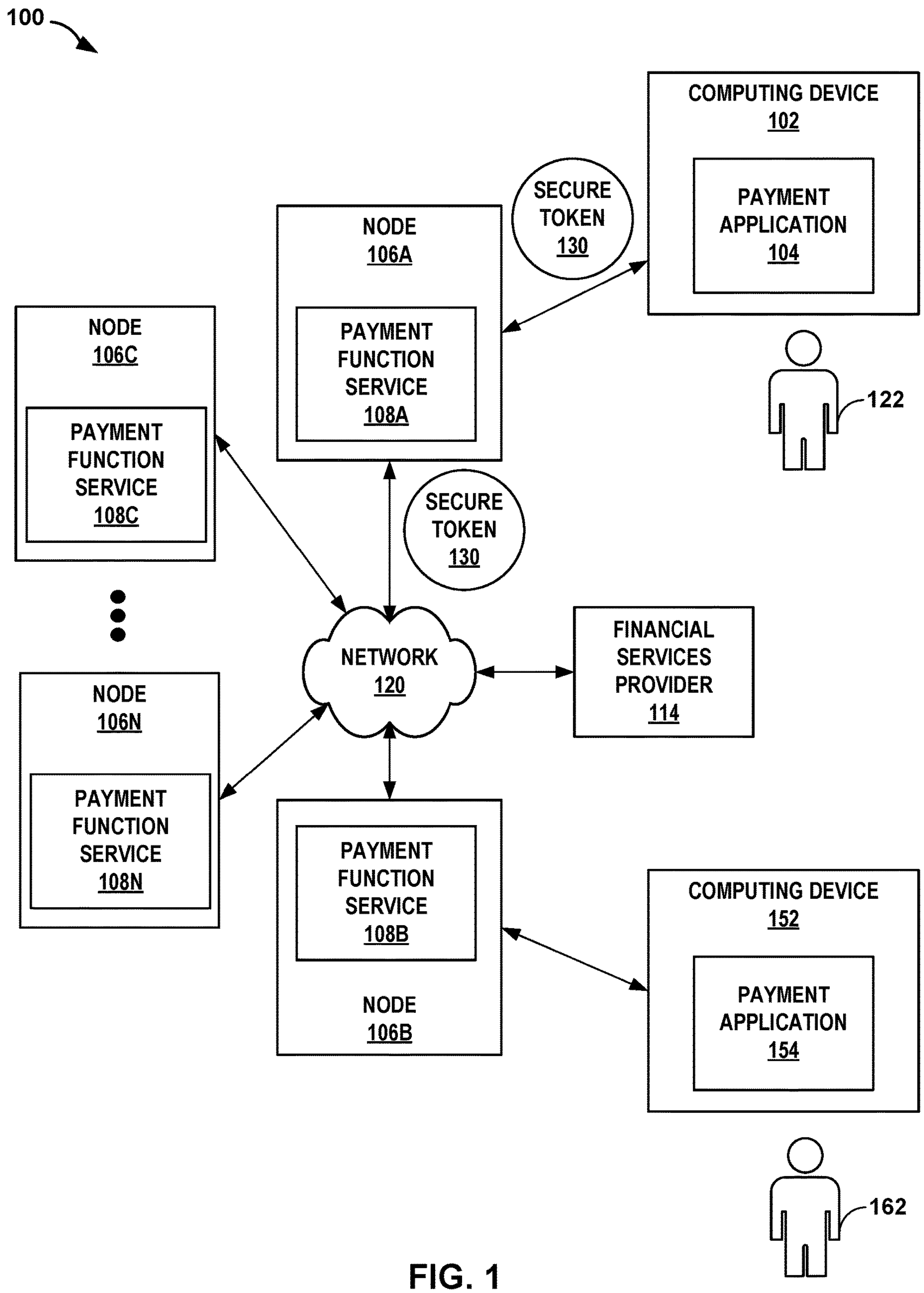
FIG. 1 is a conceptual diagram illustrating a system for secure payment transactions, in accordance with aspects of the present disclosure.

FIG. 1 is a conceptual diagram illustrating a system for secure payment transactions, in accordance with aspects of the present disclosure. As shown in FIG. 1, system 100 includes network 120 that includes nodes 106A-106N ("nodes 106"). One or more of nodes 106 may communicate with computing devices 102 and 152 being used by users 122 and 162, respectively, to enable users 122 and 162 to perform financial transactions via nodes 106 and network 120.

Network 120 represents any public or private communications network, for instance, cellular, Wi-Fi, and/or other types of networks, for transmitting data between computing systems, servers, and computing devices, such as nodes 106. In some examples, network 120 may use edge computing technology to bring computing resources closer to computing devices outside of network 120 that communicate with devices of network 120. For example, network 120 may include edge nodes that are physically located relatively close to computing devices outside of network 120, such that computing devices may communicate with the edge nodes of network 120 via wireless communications, such as radio access networks (e.g., cellular communications). For example, network 120 may include cellular communications infrastructure, such as a 5G network backbone, that contains nodes 106 at the edge of computing network 120 that is physically close to computing devices (e.g. computing devices 102 and 152) to communicate with the computing devices, such as via a cellular network (e.g., a 5G wireless network).

Nodes 106 may be computing devices that are connected to network 120. Examples of nodes 106 may include server devices, kiosks, cellular base stations, routers, point of sale systems, automated teller machines, smart meters, autonomous vehicles, smart tags, expressway toll machines, internet of things devices (e.g., smart thermostats, smart alarms, etc.), and the like. Nodes 106 may include payment function services 108A-108N ("payment function services 108"). Payment function services 108 may each act as payment function as a service (PFaaS) for each of nodes 106 to receive requests to process payments and to perform the processing of such payments. In some examples, payment function services 108 may be executable program code that execute at one or more processors of nodes 106. In some examples, payment function services 108 may be implemented in software, such as part of the processors of nodes 106, as a system on a chip of nodes 106, and the like.

Computing devices 102 and 152 may include smart phones, wearable devices (e.g., smart watches), tablets, laptop computers, desktop computers, and the like that may communicate over one or more networks with devices. Computing device 102 may include payment application 104 that executes on computing device 102. Similarly, computing device 152 may include payment application 154 that executes on computing device 152. Payment applications 104 and 154 may be executable program code, such as a software application, kernel extensions, libraries, operating system-level software, and the like that computing devices 102 and 152 may execute to communicate with one or more of nodes 106 to perform financial transactions, such as payments of currency, cryptocurrency, forex, etc. Examples of payment applications 104 and 154 may include mobile banking applications, cryptocurrency management applications, and the like.

User 122 may use computing device 102 to transact a payment, such as sending payment from a bank account or digital wallet associated with user 122 to a bank account or digital wallet associated with another user, such as user 162, requesting money from a bank account or digital wallet associated with another user, such as user 162, and the like. For example, user 122 may interact with payment application 104 to initiate a payment from a bank account or digital wallet associated with 122 to a bank account or digital wallet associated with another user, such as user 162.

Computing devices 102 and 152 may connect to nodes 106 at the edges of network 120 via any suitable communication technique such as wired or wireless communications. In general, computing devices 102 and 152 may directly connect to nodes 106 within wireless communication range without having to connect to an intermediary device or router. In some examples, computing devices 102 and 152 may connect to nodes 106 via radio access networks such as cellular communications (e.g., 5G cellular connections). In some examples, computing devices 102 and 152 may connect to nodes 106 via short-range wireless communications such as radio frequency identification (RFID), near field communications (NFC), Bluetooth, and the like.

In the example of FIG. 1, computing device 102 may initiate a payment by communicating with network node 106A via any of the communication techniques described above to send a request to perform a payment to network node 106A. For example, computing device 102 may send, to network node 106A, a request to transact the payment of a specified amount of money from a bank account or digital wallet associated with user 122 to a bank account or digital wallet associated with user 162.

Network node 106A may receive, from computing device 102, the request to perform the payment. In some examples, network node 106A may, in response to receiving the request to perform the payment, determine a payment function service 108A at network node 106A to process the payment. In some examples, if network node 106A includes a single payment function service 108A, network node 106A may select payment function service 108A to process the payment.

In some examples, if network node 106A includes two or more payment function services, network node 106A may select a payment function service (e.g., payment function service 108A) out of the two or more payment function services at network node 106A to process the payment. Network node 106A may select the payment function service to process the payment using any suitable technique. In some examples, network node 106A may select the payment function service that is available to process the payment out of the two or more payment function services. In some examples, network node 106A may select the payment function service that is able to more quickly process the payment out of the two or more payment function services.

Network node 106A may, in response to receiving the request to perform the payment, establish a secure tunnel between network node 106A and computing device 102 using any suitable cryptographic technique. Payment function service 108A may, in response to network node 106A receiving the request from computing device 102, acknowledge the request by sending an acknowledgement of the request, such as via the secure tunnel, to computing device 102. Examples of such an acknowledgement may include a token, a session identifier (session ID), and the like.

Payment application 104 may, in response to computing device 102 receiving the acknowledgement of the request, send details of the payment to payment function service 108A. The details of the payment may include, for example, details of the bank account or digital wallet of user 122 from which a payment is to be withdrawn to be sent to a recipient, the amount of the payment, an identity of user 162 who is the intended recipient of the payment, and the like.

For example, if user 122 is using computing device 102 to send funds to a cryptocurrency wallet of user 162, the details of the payment may include details of the bank account or digital wallet of user 122 from which a payment is to be withdrawn, the amount of the payment (e.g., in U.S. dollars), the address of user 162's cryptocurrency wallet to which the payment is to be sent, and/or an identifier of user 162 (e.g., user 162's e-mail address). In another example, if user 122 is using computing device 102 to send funds via a peer-to-peer payment service, the details of the payment may include an identifier of user 122 in the peer-to-peer payment service (e.g., an e-mail address or phone number associated with user 122), an identifier of user 162 in the peer-to-peer payment service (e.g., an e-mail address or phone number associated with user 162), an indication of the peer-to-peer payment service, the amount of the payment, etc.

Payment function service 108A may receive the details of the payment and may determine, based on such details of the payment received from computing device 102, a secure token 130 associated with the payment. Secure token 130 may be any suitable software token that may be used to securely encode information that can be used by payment gateways to perform settlement of the associated payment. The secure token may include any combination of a security code, a string of characters and/or numbers, a digital signature, one or more cryptographic keys, a one-time code, and the like. In some examples, such a secure token may be valid for only a specified amount of time, such as 30 seconds, one minute, and the like.

In some examples, secure token 130 may encode the details of the payment, such as details of the bank account or digital wallet of user 122 from which a payment is to be withdrawn to be sent to a recipient, the amount of the payment, an identity of user 162 who is the intended recipient of the payment, the cryptocurrency wallet address of user 162, the peer-to-peer payment service used in the payment transaction, and the like. In some examples, payment function service 108A may generate secure token 130 that encodes such details of the payment.

In some examples, payment function service 108A may obtain secure token 130 from an external server or system. For example, payment function service 108A may obtain secure token 130 from a financial services provider system 114 associated with user 122. Payment function service 108A may determine, based on the details of the payment received from computing device 102, the bank account associated with user 122 from which the payment is to be withdrawn, and may determine the financial services provider of the bank account, such as the bank where the bank account is located. Payment function service 108A may therefore determine that financial services provider system 114 is associated with the determined financial services provider and may communicate with financial services provider system 114, such as by sending the details of the payment to receive, from financial services provider system 114, security token 130.

Payment function service 108A may, in respond to receiving, generating, or otherwise determining security token 130, send the secure token 130 to computing device 102. Computing device 102 may receive the secure token 130 from payment function service 108A and may send a confirmation of the token back to payment function service 108A. Payment function service 108A may, in response to receiving the confirmation of secure token 130 from computing device 102, determine that secure token 130 is valid and may process the requested payment.

Payment function service 108A may process the payment by determining one or more payment function services associated with one or more payment gateways for transacting the payment and communicating with the one or more payment function services to process the payment. That is, payment function service 108A may determine the one or more payment gateways for transacting the payment and may determine one or more payment function services of payment function services 108 that are associated with the determined payment gateways to transact the payment.

Payment function service 108A may determine a payment gateway associated with the payer of the payment, such as user 122, also referred to herein as a parent payment gateway, as well as a payment gateway associated with the intended recipient (i.e., payee) of the payment, such as user 162, also referred to herein as a receiver payment gateway.

In some examples, the parent payment gateway associated with user 122 may be a payment gateway associated with the financial services provider at which user 122 has an account from which the requested payment is to be withdrawn. That is, if user 122 requests that the payment be withdrawn from a specified bank account at a particular bank, the parent payment gateway may be the particular bank's payment gateway.

In some examples, the receiver payment gateway associated with user 162 may be a payment gateway associated with the financial services provider at which user 162 has an account to which the requested payment is to be deposited. That is, if user 122 requests that the payment be deposited into a specified bank account of user 162 at a particular bank, the receiver payment gateway may be the particular bank's payment gateway.

In the example of FIG. 1, different payment function services 108A-108N may execute at nodes 106 at the edges of network 120 and may be associated with different payment gateways. Payment function service 108A may determine payment function services of payment function services 108 that are associated with the parent payment gateway and payment function services of payment function services 108 that are associated with the receiver payment gateway.

Payment function service 108A may negotiate with the payment function services associated with the parent payment gateway and may negotiate with the payment function services of the receiving payment gateway to transact the payment between a payment function service associated with the parent payment gateway and a payment function service associated with the receiving payment gateway. That is, payment function service 108A may select a payment function service associated with the parent payment gateway out of the plurality of payment function services associated with the parent payment gateway and a payment function service associated with the receiver payment gateway out of the plurality of payment function services associated with the receiving payment gateway to transact the requested payment.

In some examples, payment function service 108A may communicate with payment function services 108B-108N to request and receive information associated with payment function services 108B-108N, such as the associated payment gateways of each of payment function services 108B-108N, the speed at which each of payment function services 108B-108N can transact the payment, the proximity (i.e., distance) of each of payment function services 108B-108N to computing device 152 associated with user 162, the availability of ach of payment function services 108B-108N to transact the payment and the like. Based on the information received from payment function services 108B-108N, payment function service 108A may determine a payment function service associated with the parent payment gateway and a payment function service associated with the receiver payment gateway to transact the requested payment.

In the example of FIG. 1, payment function service 108A may determine to select payment function service 108C associated with the parent payment gateway and payment function service 108B associated with the receiving payment gateway to transact the payment from user 122 to user 162. Payment function service 108A may therefore communicate any suitable information for transacting the payment between user 122 and 162 to payment function services 108B and 108C at nodes 106B and 106C via network 120 to process the payment. For example, payment function service 108A may send details of the payment, such as secure token 130, information regarding the account of user 122 from which the amount of the payment is to be withdrawn, information regarding the account of user 162 to which the amount of the payment is to be withdrawn, information regarding the identity of user 122 sending the payment, information regarding the identity of user 162 receiving the payment, and the like, to payment function services 108B and 108C.

Payment function services 108B and 108C may, in response to receiving the details of the payment, perform settlement of the payment in any suitable way. Specifically, payment function services 108B and 108C may perform settlement of the payment between user 122 and user 162 to transfer funds from a bank account of user 122 to a bank account of user 162.

In some examples, payment function service 108B may, as part of performing settlement of the payment, communicate with computing device 152 used by user 162. For example, payment function service 108B may send information regarding the payment to computing device 152, so that user 162 may interact with payment application 154 to confirm the payment, select the bank account or digital wallet that is to receive the payment, and the like. Computing device 152 may therefore send, to payment function service 108B, an indication of whether user 162 has accepted the payment, information regarding the bank account or digital wallet selected to receive the payment, and the like. Payment function service 108B may, in response to receiving the indication that user 162 has accepted the payment and the information regarding the bank account or digital wallet selected to receive the payment, perform, along with payment function service 108C, settlement of the payment between user 122 and user 162, including transferring funds from a bank account of user 122 to the selected bank account or digital wallet of user 162.

Figure 2:
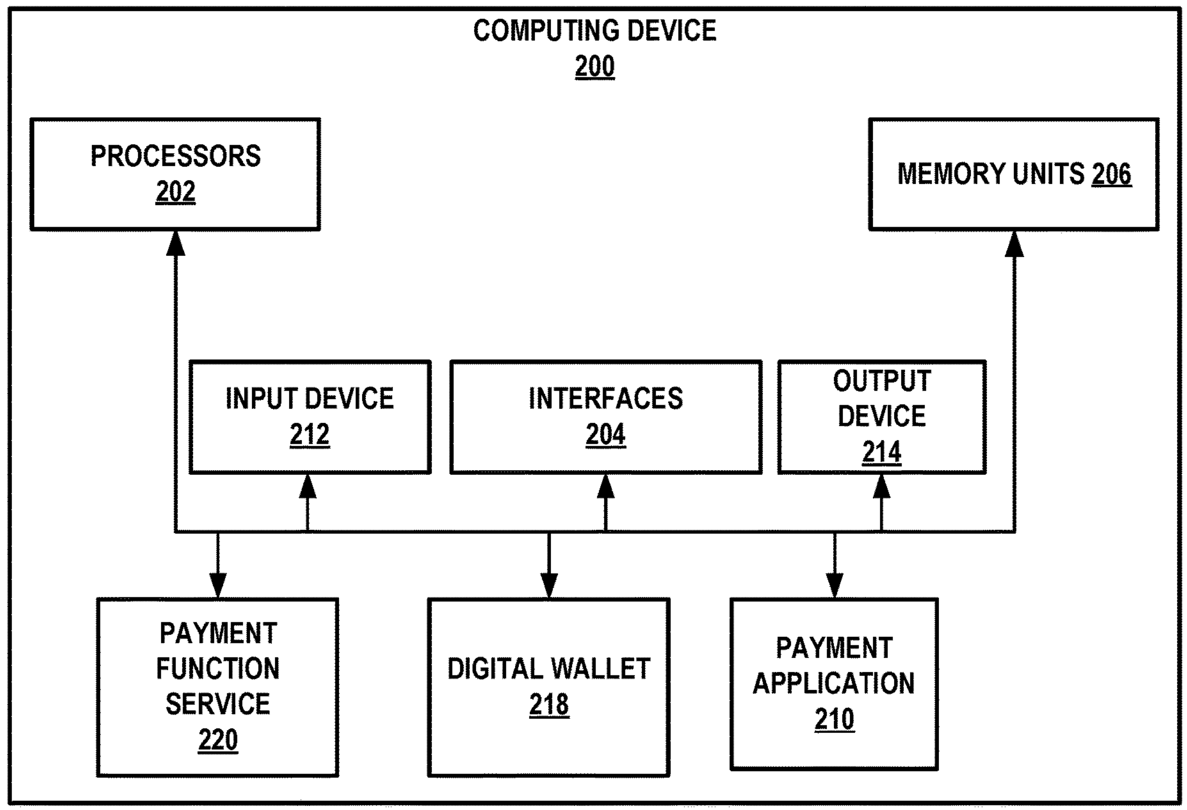
FIG. 2 is a block diagram illustrating an example computing device, in accordance with the techniques of this disclosure.

FIG. 2 is a block diagram illustrating an example computing device 200, in accordance with the techniques of this disclosure. Computing device 200 may be examples of computing devices 102 and 152 of FIG. 1. The architecture of computing device 200 illustrated in FIG. 2 is shown for exemplary purposes only. Computing device 200 should not be limited to the illustrated example architecture. In other examples, computing device 200 may be configured in a variety of ways. For instance, although computing device 200 is illustrated in a single computing device in the example of FIG. 2, in other examples, functional units may be executed on a centralized or distributed network of computing devices.

As shown in the example of FIG. 2, computing device 200 includes one or more processors 202, one or more interfaces 204, one or more memory units 206, input device 212, and output device 214. Computing device 200 also includes payment application 210 and, in some examples, digital wallet 216, which may be implemented as program instructions and/or data stored in memory units 206 and executable by processors 202 or implemented as one or more hardware units or devices of computing device 200. Memory units 206 of computing device 200 may also store an operating system (not shown) executable by processors 202 to control the operation of components of computing device 200. The components, units or modules of computing device 200 are coupled (physically, communicatively, and/or operatively) using communication channels for inter-component communications. In some examples, the communication channels may include a system bus, a network connection, an inter-process communication data structure, or any other method for communicating data.

Processors 202, in one example, may comprise one or more processors that are configured to implement functionality and/or process instructions for execution within computing device 200. For example, processors 202 may be capable of processing instructions stored by memory units 206. Processors 202 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory units 206 may be configured to store information, such as payment application 210 and/or digital wallet 218, within computing device 200 during operation. Memory units 206 may include a computer-readable storage medium or computer-readable storage device. In some examples, memory units 206 include one or more of a short-term memory or a long-term memory. Memory units 206 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory units 206 are used to store program instructions for execution by processors 202. Memory units 206 may be used by software or applications running on computing device 200 (e.g., payment application 210) to temporarily store information during program execution.

Input device 212 of computing device 200 may be configured to receive input, such as from users of computing device 200. Examples of input are tactile, audio, and video input. Input device 212 of computing device 200, in one example, includes a presence-sensitive display, touch-sensitive screen, mouse, keyboard, voice responsive system, video camera, microphone or any other type of device for detecting input from a human or machine.

Output device 214 of computing device 200 may be configured to generate output. Examples of output are tactile, audio, and video output. Output device 214 of computing device 200, in one example, includes a presence-sensitive display, sound card, video graphics adapter card, speaker, cathode ray tube (CRT) monitor, liquid crystal display (LCD), or any other type of device for generating output to a human or machine.

Computing device 110 may utilize interfaces 204 to communicate with external devices via one or more networks. Interfaces 204 may be network interfaces, such as Ethernet interfaces, optical transceivers, radio frequency (RF) transceivers, or any other type of devices that can send and receive information. Other examples of such network interfaces may include Wi-Fi or Bluetooth radios, cellular (e.g., 5G) modems, Near Field Communication (NFC) modules, and the like.

According to the disclosed techniques, processors 202 may execute payment application 210 to connect computing device 200 to a payment function service (e.g., one of payment function services 108 of FIG. 1) to perform a payment, such as payment of currency, between a user of computing device 200 and another user. Examples of payment application 210 may include a banking application, a cryptocurrency management application, a mobile wallet application, or any other application that enables performance of payments.

In some examples, payment application 210 may access one or more online financial accounts of a user, such as a bank account, a checking account, a savings account, an investment account, a retirement account, a cryptocurrency wallet, and the like. In some examples, payment application 210 may access digital wallet 218 at computing device 200. Digital wallet 218 may be a program or service that allows one party to make electronic transactions with another party. Digital wallet 218 may be a hot wallet or a cold wallet. In some examples, digital wallet 218 may be a cryptocurrency wallet that stores public and/or private keys for cryptocurrency transactions.

In accordance with aspects of the present disclosure, computing device 200 may receive user input from the user of computing device 200 that causes computing device 200 to communicate with a payment function service to transact a payment between the user of computing device 200 and another user. The user may interact with payment application 210 to specify payment information, such as the amount of currency to be paid, the financial account and/or digital wallet from which the currency is to be paid, the recipient of the payment, and the like. For example, the user may provide user input at payment application 210 to specify the amount of the payment in a currency, such as in dollars, the bank account from which the payment is to be paid, and the recipient of the payment, such as the name of the recipient, the recipient's e-mail address, the recipient's phone number, the recipient's social media handle, and the like.

Computing device 200 may, in response to receiving the user input indicative of a payment between the user of computing device 200 and another user, communicate with a payment function service to transact the payment. Computing device 200 may communicate with a payment function service in any number of ways, including via wireless communications (e.g., Bluetooth communications, Wi-Fi, cellular communications, etc.), via short-range communications such as NFC (e.g., by moving computing device 200 within close proximity of the computing device that includes the payment function service), and the like.

In some examples, computing device 200 may communicate with a payment function service implemented by an external device that is within wireless communications range of computing device 200. For example, if computing device 200 communicates with payment function services via a radio access network (e.g., a 5G connection), computing device 200 may communicate with a payment function service that is within range of the radio access network of computing device 200.

In some examples, when computing device 200 is able to communicate with a plurality of payment function services, computing device 200 may select a payment function service with which to communicate to transact the payment out of the plurality of payment function services. In some examples, if two or more payment function services are within communications range of computing device 200, computing device 200 may select the payment function service that is nearest in distance to computing device 200 with which to communicate. In some examples, computing device 200 may determine the capacity of each of the two or more payment function services to process the payment, and may select the payment function service that has available capacity to process the payment. In other examples, computing device 200 may use any other suitable technique to select a payment function service with which to communicate to transact the payment.

Computing device 200 may therefore send a request to transact a payment to the payment function service. Computing device 200 may, in response, receive an acknowledgement of the request from the payment function service. The acknowledgement may indicate a session ID, a token, and the like. The payment function service and computing device 200 may therefore establish a secure communications channel (e.g., a secure tunnel) between the payment function service and computing device 200.

Computing device 200 may, in response to receiving the acknowledgement of the request from the payment function service, send confirmation of the details of the payment to be transacted to the payment function service. For example, the details of the payment to be transacted may include the amount of the payment, the account number of the bank account from which the payment is to be withdrawn, information regarding the digital wallet (e.g., digital wallet 218) from which the payment is to be withdrawn, the device identifier of computing device 200, a token, and the like. The details of the payment to be transacted may include the identity of the recipient of the payment, such as a user identifier, a phone number, an e-mail address, a digital wallet address, a name, and the like.

Computing device 200 may, in response to sending confirmation of the details of the payment to be transacted to the payment function service, receive, from the payment function service, a secure token. The secure token may be any suitable software token that may be used to securely encode information used for settlement of the transaction. The secure token may include any combination of a security code, a string of characters and/or numbers, a digital signature, one or more cryptographic keys, a one-time code, and the like. In some examples, such a secure token may be valid for only a specified amount of time, such as 30 seconds, one minute, and the like.

In some examples, the secure token may also include encrypted information regarding the details of the payment to be transacted, such as the identity of the recipient, the amount of payment, the account number of the bank account from which the payment is to be withdrawn, information regarding the digital wallet (e.g., digital wallet 218) from which the payment is to be withdrawn, the device identifier of computing device 200, a token, and the like. Computing device 200 may, in response to receiving the secure token from the payment function service, send a confirmation of the secure token to the payment function service to confirm that computing device 200 has received the secure token. The payment function service may therefore operate to transact the requested payment.

In some examples, computing device 200 may communicate with a payment function service so that a user of computing device 200 may receive a payment. For example, if the user of computing device 200 is being sent a payment from another user, computing device 200 may receive, from the payment function service, an indication of a payment from another user to the user of the computing device 200. In some examples, the indication of the payment may be in the form of an alert or notification to notify the user of computing device 200 that they have received a payment. In some examples, the indication of the payment may include a request for the selection of a bank account and/or digital wallet to receive the payment. The user of computing device 200 may provide user input to interact with payment application 210 to select the bank account and/or digital wallet to receive the payment, and computing device 200 may send an indication of the selected bank account and/or digital wallet to the payment function service.

In some examples, instead of communicating with a payment function service at an external device, computing device 200 may include payment function service 220. Computing device 200 may implement payment function service 220 as software executing at processors 202, as hardware, such as in a system on the chip, as part of processors 202, and the like. The details of payment function service 220 are similar to those of the payment function service described in further detail below with respect to FIG. 3.

Figure 3:
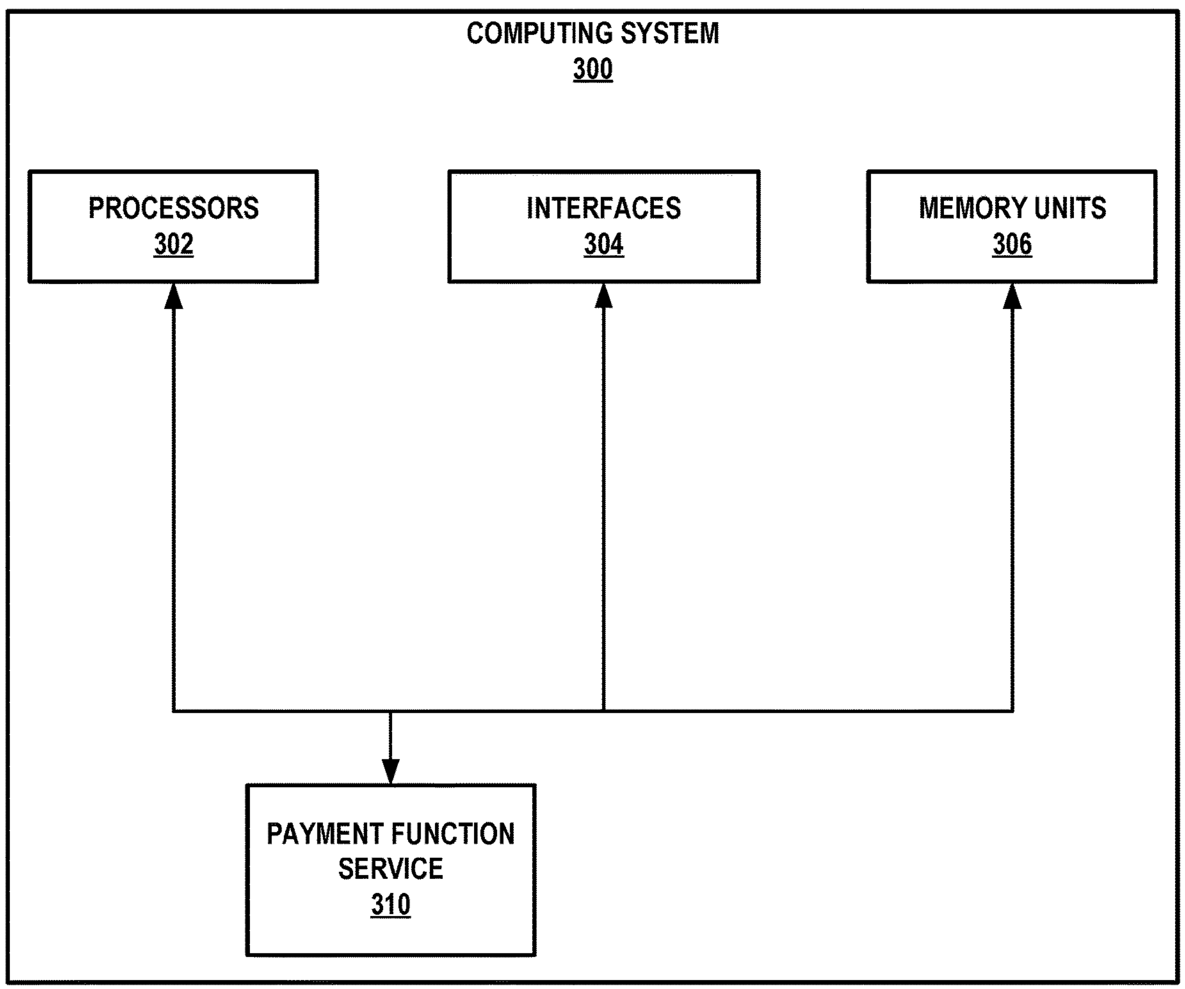
FIG. 3 is a block diagram illustrating an example computing device in accordance with the techniques of this disclosure.

FIG. 3 is a block diagram illustrating an example computing device 300 in accordance with the techniques of this disclosure. Computing device 300 may be an example of any of nodes 106 shown in FIG. 1. The architecture of computing device 300 illustrated in FIG. 3 is shown for exemplary purposes only. Computing device 300 should not be limited to the illustrated example architecture. In other examples, computing device 300 may be configured in a variety of ways. For instance, although computing device 300 is illustrated in a single computing device in the example of FIG. 3, in other examples, functional units may be executed on a centralized or distributed network of computing devices.

As shown in the example of FIG. 3, computing device 300 includes one or more processors 302, one or more interfaces 304, and one or more memory units 306. Computing device 300 also includes payment function service 310, which may be implemented as program instructions and/or data stored in memory units 306 and executable by processors 302, or implemented as one or more hardware units or devices of computing device 300 (e.g., as a system on a chip). Memory units 306 of computing device 300 may also store an operating system (not shown) executable by processors 302 to control the operation of components of computing device 300. The components, units or modules of computing device 300 are coupled (physically, communicatively, and/or operatively) using communication channels for inter-component communications. In some examples, the communication channels may include a system bus, a network connection, an inter-process communication data structure, or any other method for communicating data.

Processors 302, in one example, may comprise one or more processors that are configured to implement functionality and/or process instructions for execution within computing device 300. For example, processors 302 may be capable of processing instructions stored by memory units 306. Processors 302 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory units 306 may be configured to store information within computing device 300 during operation. Memory units 306 may include a computer-readable storage medium or computer-readable storage device. In some examples, memory units 306 include one or more of a short-term memory or a long-term memory. Memory units 36 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory units 306 are used to store program instructions for execution by processors 302. Memory units 306 may be used by software or applications running on computing device 300 to temporarily store information during program execution.

Computing device 110 may utilize interfaces 304 to communicate with external devices, such as computing device 102 via one or more networks. Interfaces 304 may be network interfaces, such as Ethernet interfaces, optical transceivers, radio frequency (RF) transceivers, or any other type of devices that can send and receive information. Other examples of such network interfaces may include Wi-Fi, cellular, or Bluetooth radios. In some examples, computing device 300 utilizes interfaces 304 to wirelessly communicate with external devices, such as via Wi-Fi, NFC, radio access networks (e.g., 5G), and the like.

According to the disclosed techniques, payment function service 310 may perform a payment function as a service to transact payments between bank accounts and/or digital wallets of users. For example, payment function service 310 may receive, from a computing device, a request to transact a payment from a payer that is the user of the computing device to a payee. Payment function service 310 may, in response to receiving the request, send an acknowledgement of the request back to the requesting computing device, such as in the form of a session identifier, a token, and the like, and may establish a secure connection with the computing device via any suitable cryptographic technique.

Payment function service 310 may receive, from the computing device via the secure connection, details of the payment to be transacted. For example, the details of the payment to be transacted may include the amount of the payment, the account number of the bank account from which the payment is to be withdrawn, information regarding the digital wallet from which the payment is to be withdrawn, the device identifier of the computing device, a token, and the like. The details of the payment to be transacted may also include the identity of the recipient of the payment, such as a user identifier, a phone number, an e-mail address, a digital wallet address, a name, and the like.

Payment function service 310 may determine a secure token associated with the payment based at least in part on the details of the payment to be transacted. The secure token may be any suitable software token that may be used to securely encode information used for settlement of the transaction. The secure token may include any combination of a security code, a string of characters and/or numbers, a digital signature, one or more cryptographic keys, a one-time code, and the like. In some examples, such a secure token may be valid for only a specified amount of time, such as 30 seconds, one minute, and the like. In some examples, the secure token may also include encrypted information regarding the details of the payment to be transacted, such as the identity of the recipient, the amount of payment, the account number of the bank account from which the payment is to be withdrawn, information regarding the digital wallet (from which the payment is to be withdrawn, the device identifier of the computing device, a token, and the like.

In some examples, if the payment to be transacted is from an account of the user in a financial institution, payment function service 310 may determine the secure token by communicating with one or more systems of the financial institution to receive the secure token. For example, payment function service 310 may determine, based at least in part on the details of the payment, the financial institution associated with the account of the user from which the payment is to be withdrawn. Payment function service 310 may therefore send the details of the payment to be transacted to one or more systems of the determined financial institution and may, in response, receive the secure token from the one or more systems of the determined financial institution. Payment function service 310 may, in response to receiving or otherwise determining the secure token, send the secure token to the computing device that requested the payment to be transacted. Payment function service 310 may, in response to sending the secure token to the computing device, receive a confirmation of the secure token back from the computing device.

Payment function service 310 may determine a parent gateway and a receiving payment gateway associated with the recipient of the payment. For example, if the requested payment to be transacted is a payment from a payer's account at a particular financial services provider to the payee's account at a particular financial services provider, payment function service 310 may determine that the parent payment gateway is a payment gateway associated with the financial services provider of the payer's account, and that the receiving payment gateway is a payment gateway associated with the financial services provider of the payee's account. In some examples, if the requested payment to be transacted is a payment to the payee's cryptocurrency wallet, payment function service 310 may determine the receiving payment gateway associated with the recipient may include a cryptocurrency exchange. In some examples, if the payment to be transacted is from the payer's account at a financial institution to the payee's account at the same financial institution, payment function service 310 may determine that the receiving payment gateway is the same as the parent payment gateway.

Payment function service 310 may negotiate with payment function services of payment gateways. For example, payment function service 310 may, in response to determining the receiving payment gateway associated with the recipient of the service, communicate with the receiving payment gateway to negotiate with the receiving payment gateway to act as the receiving payment gateway to receive the payment and to deposit the payment to an account associated with the payer.

Payment function service 310 may select, for a receiving payment gateway, a payment function service associated with the receiving payment gateway for transacting the payment. That is, a receiving payment gateway may be associated with more than one payment function service. Thus, in some instances, payment function service 310 may select a payment function service associated with the receiving payment gateway out of a plurality of payment function services.

In some examples, payment function service 310 may select a payment function service with which to transact a payment out of a plurality of payment function services of a payment gateway based on a proximity to the computing device of the user receiving the payment. For example, payment function service 310 may select the payment function service that is physically the nearest to the computing device 152 used by the payer. In another example, payment function service 310 may select the payment function service that is within wireless communication range (e.g., via a radio access network connection) of the computing device used by the payer.

In some examples, payment function service 310 may select a payment function service with which to transact a payment out of a plurality of payment function services of a payment gateway based on the availability of each of the plurality of payment function services. A payment function service may not be available for any number of reasons, such as lack of payment processing capacity, the payment function service being turned off or being out of service, and the like. Thus, for example, payment function service 310 may select the payment function service that is available to transact the payment with payment function service 310.

In some examples, payment function service 310 may select itself as the payment function service of the parent payment gateway for transacting the payment. Payment function service 310 may, in response to selecting a payment function service of a payment gateway associated with the intended recipient of the payment, communicate with the financial function service to transact the payment. Payment function service 310 may directly communicate with the financial function service of the payment gateway associated with the intended recipient of the payment without going through any third-party gateways.

Payment function service 310 may send, to the selected payment function service, any suitable information for transacting the payment along with the secure token. Examples of such information may include information regarding the amount of the payment, information regarding the account of the payer from which the amount of the payment is to be withdrawn, information regarding the account of the payee to which the amount of the payment is to be withdrawn, information regarding the identity of the payer sending the payment, information regarding the identity of the payee receiving the payment, and the like.

In some examples, payment function service 310 may perform settlement of the payment with the selected payment function service in any suitable way. As described above, payment function service 310 may send the secure token to the selected payment function service as part of the transacting the payment. The selected payment function service may, in response to receiving secure token from payment function service 310, send an acknowledgement of the secure token to payment function service 310. For example, the selected payment function service may, in response to receiving secure token from payment function service 310, send the secure token back to payment function service 310. Payment function service 310 and the selected payment function service may therefore perform settlement of the payment between the payer and the payee, including transferring funds from a bank account of the payer to a bank account of the payee.

Figure 4:
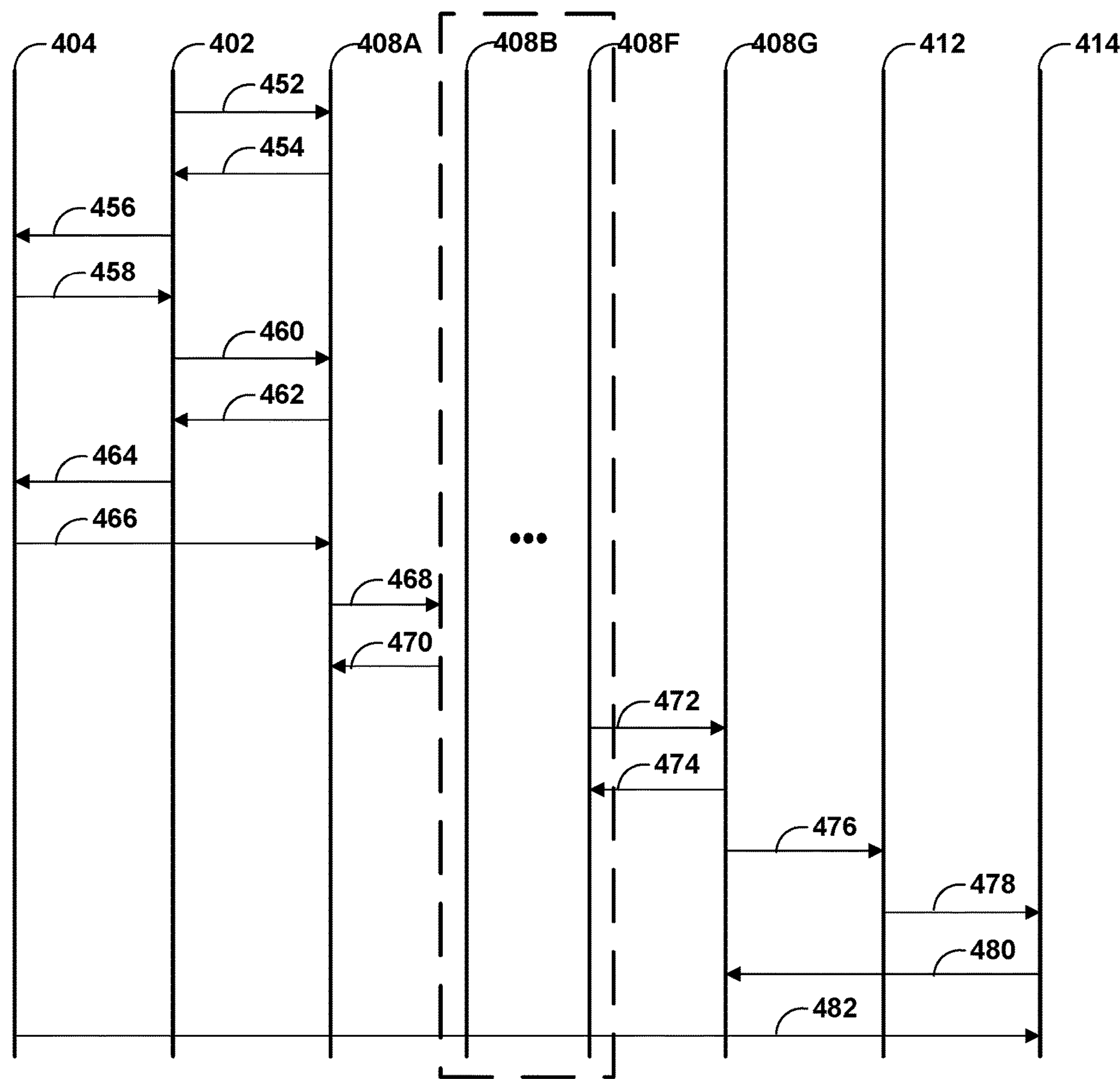
FIG. 4 is a diagram illustrating a technique for secure payment transactions, in accordance with aspects of the present disclosure.

FIG. 4 is a diagram illustrating a technique for secure payment transactions, in accordance with aspects of the present disclosure. As shown in FIG. 4, a payer may use payment application 404 executing at computing device 402, similar to payment application 104 executing at computing device 102 of FIG. 1, to make a payment to a payee using payment application 414 executing at computing device 412, similar to payment application 154 executing at computing device 152 of FIG. 1.

Computing device 402 may, in response to a user initiating a request to send a payment to a payee, send a request to transact a payment between the user as a payer and a payee to payment function service 408A, which is similar to payment function service 108A of FIG. 1 (452). Payment function service 408A may be one of a plurality of payment function services 408A-408G in a secure payment environment.

Payment function service 408A may, in response to receiving the request to transact the payment, send an acknowledgement back to computing device 402A, such as by sending a session identifier or token back to computing device 402A (454). Computing device 402 may, in response to receiving the acknowledgement of the request, connect the token received in the acknowledgement to the payment application 404 (456). Payment application 404 may send an acknowledgement of the token to computing device 402, where the acknowledgement may include details of the payment, such as the amount of the payment, the bank account and/or digital wallet from which the payment is to be withdrawn, and the identity of the recipient (458). Computing device 402 may forward such details of the payment to payment function service 408A (460).

Payment function service 408A may, in response to receiving the details of the payment, receive, generate, or otherwise determine a secure token associated with the payment, and may send the secure token to computing device 402 (462). Computing device 402 may extend the secure token to payment application 404 (464), and payment application 404 may send confirmation of the secure token back to payment function service 408A (466).

Payment function service 408A may, in response to receiving the confirmation of the secure token from payment application 404, process the requested payment. Payment function service 408A may, as part of processing the requested payment, negotiate with one or more payment function services 408B-408F of payment gateways to determine one or more payment gateways used to transact the payment and to determine the payment function services of the payment gateways used to transact the payment (468). Specifically, payment function service 408A may, as a part of negotiating with the one or more payment function services 408B-408F, determine a payment gateway with the payer of the payment and a receiving payment gateway associated with the payee of the payment. For example, payment function service 408A may send, to one or more payment function services 408B-408F, details of the requested payment, the secure token, and any other suitable information as part of negotiating with the one or more payment function services 408B-408B.

Payment function service 408A may, as a part of negotiating with the one or more payment function services 408B-408F, also select the payment function service of the payment gateway associated with the payer and the payment function service of the receiving payment gateway associated with the payee. For example, payment function service 408A may select payment function service 408F as the payment function service of the payment gateway associated with the payer, and may select payment function service 408G as the payment function service of the payment gateway associated with the payee. One or more payment function services 408B-408F may, at the end of the negotiation, send the results of the negotiation, such as the payment gateways and/or payment function services selected to process the payment, to payment function service 408A (470).

Payment function service 408F, which is the payment function service of the payment gateway associated with the payer, may send a request to make a payment to payment function service 408G, which is the payment function service of the receiving payment gateway associated with the payee (472). Payment function service 408G may, in response to receiving the request to make the payment, accept the request to make the payment and send an acknowledgement of the request to payment function service 408F (474).

Payment function service 408G may therefore communicate the request to make the payment to computing device 412 used by the payee of the payment (476), which may send the request to make the payment to payment application 414 executing on computing device 412, with which the payee may interact to select the bank account and/or digital wallet to receive the payment (478). Payment application 414 may send, to payment function service 408G, the selected bank account and/or digital wallet to receive the payment (480), and therefore payment function services 408F and 408G may transact the payment from a bank account and/or digital wallet of the payor to the selected bank account and/or digital wallet of the payee (482).

Figure 5:
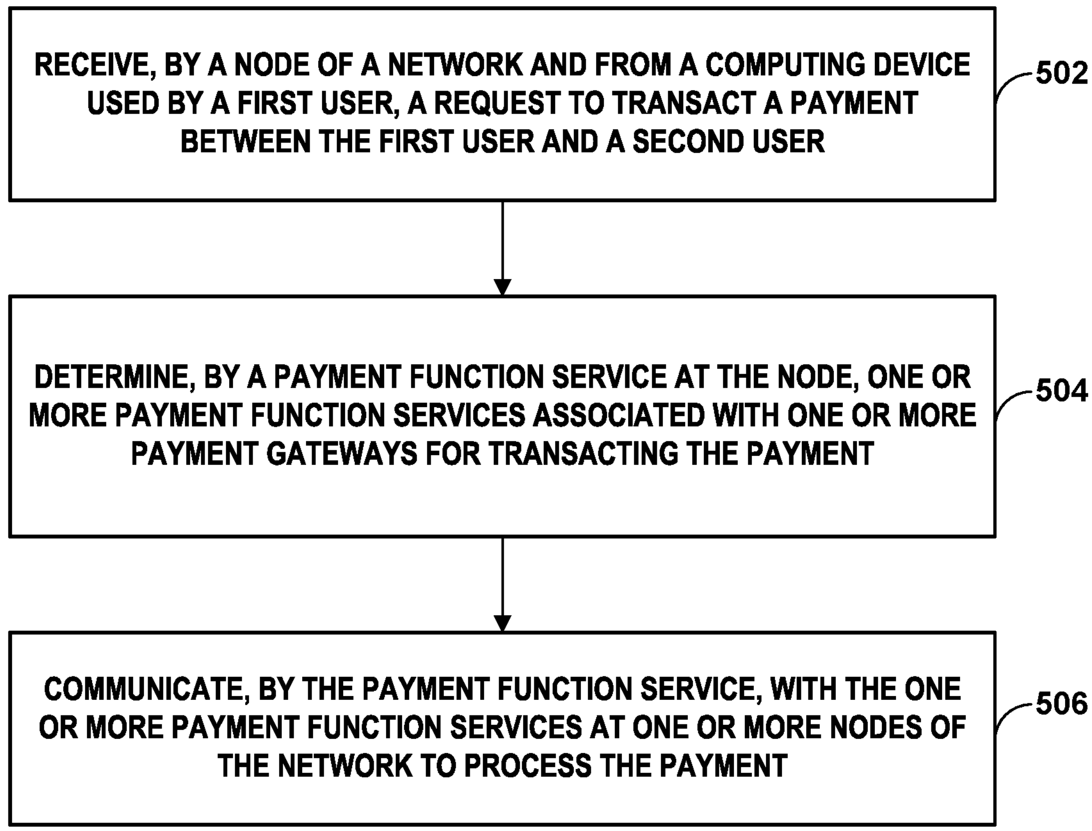
FIG. 5 is a flowchart illustrating operations of a payment function service, in accordance with aspects of the present disclosure.

FIG. 5 is a flowchart illustrating operations of a payment function service, in accordance with aspects of the present disclosure. FIG. 5 is described with respect to payment function service 108A of FIG. 1.

As shown in FIG. 5, a node 106A of a network 120 may receive, from a computing device 102 associated with a first user 122, a request to transact a payment between the first user 122 and a second user 162 (502). A payment function service 108A at the node 106A may negotiate with a first plurality of payment function services of a parent payment gateway associated with the first user 122 and with a second plurality of payment function services of a receiving payment gateway associated with the second user 162 to transact the payment between a second payment function service 108C of the parent payment gateway and a third payment function service 108B of the receiving payment gateway (504). The payment function service 108A may communicate with the second payment function services 108C and the third payment function service 108B to process the payment (506).

In some examples, the payment function service 108A may determine a secure token 130 associated with the payment and may send the secure token 130 to at least one of: the second payment function service 108C or the third payment function service 108B for settlement of the payment.

In some examples, the first plurality of payment function services and the second plurality of payment function services are at a plurality of edge nodes 106 of the network 120.

In some examples, to negotiate with the first plurality of payment function services of a parent payment gateway associated with the first user 122 and with the second plurality of payment function services of a receiving payment gateway associated with the second user 162, payment function service 108A may select the third payment function service 108B out of the second plurality of payment function services of the receiving payment gateway based at least in part on a proximity of the third payment function service to a second computing device 152 associated with the second user 162.

In some examples, to negotiate with the first plurality of payment function services of a parent payment gateway associated with the first user 122 and with the second plurality of payment function services of a receiving payment gateway associated with the second user 162, payment function service 108A may select the third payment function service 108B out of the second plurality of payment function services of the receiving payment gateway based at least in part on a transaction speed of the third payment function service 108B for transacting the payment.

In some examples, node 106A may, in response to receiving the request to transact the payment between the first user 122 and the second user 162, select the payment function service 108B of the node 106A out of a plurality of payment function services at the node 106A to service the request to transact the payment.

In some examples, one or more processors of the node 106A include the payment function service 108A.

In some examples, to receive the request to transact the payment between the first user 122 and the second user 162, node 106A may communicate with the computing device 102 via a wireless network connection.

In some examples, the payment is from a first bank account associated with the first user 122 to a second bank account associated with the second user 162.

In some examples, the payment is from a first digital wallet associated with the first user 122 to a second digital wallet associated with the second user 162.

In some examples, the payment comprises cryptocurrency.

This disclosure includes the following examples.

Example 1: A method includes receiving, by a node of a network and from a computing device associated with a first user, a request to transact a payment between the first user and a second user; negotiating, by the payment function service, with a first plurality of payment function services of a parent payment gateway associated with the first user and with a second plurality of payment function services of a receiving payment gateway associated with the second user to transact the payment between a second payment function service of the parent payment gateway and a third payment function service of the receiving payment gateway; and communicating, by the payment function service, with the second payment function service and the third payment function service to process the payment.

Example 2: The method of example 1, further includes determining, by the payment function service, a secure token associated with the payment; and sending, by the payment function service, the secure token to at least one of: the second payment function service or the third payment function service for settlement of the payment.

Example 3: The method of example 1, wherein the first plurality of payment function services and the second plurality of payment function services are at a plurality of edge nodes of the network.

Example 4: The method of example 1, wherein negotiating with the first plurality of payment function services of a parent payment gateway associated with the first user and with the second plurality of payment function services of a receiving payment gateway associated with the second user further comprises: selecting, by the payment function service, the third payment function service out of the second plurality of payment function services of the receiving payment gateway based at least in part on a proximity of the third payment function service to a second computing device associated with the second user.

Example 5: The method of example 1, wherein negotiating with the first plurality of payment function services of a parent payment gateway associated with the first user and with the second plurality of payment function services of a receiving payment gateway associated with the second user further comprises: selecting, by the payment function service, the third payment function service out of the second plurality of payment function services of the receiving payment gateway based at least in part on a transaction speed of the third payment function service for transacting the payment.

Example 6: The method of example 1, further includes in response to receiving the request to transact the payment between the first user and the second user, selecting the payment function service of the node out of a plurality of payment function services at the node to service the request to transact the payment.

Example 7: The method of example 1, wherein one or more processors of the node include the payment function service.

Example 8: The method of example 1, wherein receiving, by the payment service at the node of the node of the network and from the computing device, the request to transact the payment between the first user and the second user further comprises: communicating, by the payment function service, with the computing device via a wireless network connection.

Example 9: The method of example 1, wherein the payment is from a first bank account associated with the first user to a second bank account associated with the second user.

Example 10: The method of example 1, wherein the payment is from a first digital wallet associated with the first user to a second digital wallet associated with the second user.

Example 11: The method of example 1, wherein the payment comprises cryptocurrency.

Example 12: A computing device includes memory; and one or more processors in communication with the memory and configured to: receive, from an external computing device associated with a first user, a request to transact a payment between the first user and a second user; negotiate with a first plurality of payment function services of a parent payment gateway associated with the first user and with a second plurality of payment function services of a receiving payment gateway associated with the second user to transact the payment between a second payment function service of the parent payment gateway and a third payment function service of the receiving payment gateway; and communicate with the second payment function service and the third payment function service to process the payment.

Example 13: The computing device of example 12, wherein the one or more processors are further configured to: determine a secure token associated with the payment; and send the secure token to at least one of: the second payment function service or the third payment function service for settlement of the payment.

Example 14: The computing device of example 12, wherein the first plurality of payment function services and the second plurality of payment function services are at a plurality of edge nodes of the network.

Example 15: The computing device of example 12, wherein to negotiate with the first plurality of payment function services of a parent payment gateway associated with the first user and with the second plurality of payment function services of a receiving payment gateway associated with the second user, the one or more processors are further configured to: select the third payment function service out of the second plurality of payment function services of the receiving payment gateway based at least in part on a proximity of the third payment function service to a second computing device associated with the second user.

Example 16: The computing device of example 12, wherein to negotiate with the first plurality of payment function services of a parent payment gateway associated with the first user and with the second plurality of payment function services of a receiving payment gateway associated with the second user, the one or more processors are further configured to: select the third payment function service out of the second plurality of payment function services of the receiving payment gateway based at least in part on a transaction speed of the third payment function service for transacting the payment.

Example 17: The computing device of example 12, wherein receiving, to receive, from the external computing device, the request to transact the payment between the first user and the second user, the one or more processors are further configured to: communicate with the external computing device via a wireless network connection.

Example 18: The computing device of example 12, wherein the payment is from a first bank account associated with the first user to a second bank account associated with the second user.

Example 19: The computing device of example 12, wherein the payment is from a first digital wallet associated with the first user to a second digital wallet associated with the second user.

Example 20: A non-transitory computer-readable storage medium includes receive, from an external computing device associated with a first user, a request to transact a payment between the first user and a second user; negotiate with a first plurality of payment function services of a parent payment gateway associated with the first user and with a second plurality of payment function services of a receiving payment gateway associated with the second user to transact the payment between a second payment function service of the parent payment gateway and a third payment function service of the receiving payment gateway; and communicate with the second payment function service and the third payment function service to process the payment.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:

receiving, by a computing device of an edge node of a network and from an external computing device associated with a first user, a request to transact a payment between the first user and a second user;

negotiating, by a payment function service executing at one or more processors of the computing device, with a first plurality of payment function services executing at a first one or more computing devices of a parent payment gateway associated with the first user and with a second plurality of payment function services executing at a second one or more computing devices of a receiving payment gateway associated with the second user to transact the payment between a second payment function service of the parent payment gateway and a third payment function service of the receiving payment gateway, wherein the parent payment gateway and the receiving payment gateway are at nodes of the network; and communicating, by the payment function service executing at the one or more processors of the computing device, with the second payment function service and the third payment function service to process the payment, including sending, by the payment function service executing at the one or more processors of the computing device, a secure token associated with the payment to at least one of: the second payment function service or the third payment function service for settlement of the payment.

2. The method of claim 1, wherein the first one or more computing devices and the second one or more computing devices are at a plurality of edge nodes of the network.

3. The method of claim 1, wherein negotiating with the first plurality of payment function services of a parent payment gateway associated with the first user and with the second plurality of payment function services of a receiving payment gateway associated with the second user further comprises:

selecting, by the payment function service executing at the one or more processors of the computing device, the third payment function service out of the second plurality of payment function services of the receiving payment gateway based at least in part on a proximity of the third payment function service to a second computing device associated with the second user.

4. The method of claim 1, wherein negotiating with the first plurality of payment function services of a parent payment gateway associated with the first user and with the second plurality of payment function services of a receiving payment gateway associated with the second user further comprises:

selecting, by the payment function service executing at the one or more processors of the computing device, the third payment function service out of the second plurality of payment function services of the receiving payment gateway based at least in part on a transaction speed of the third payment function service for transacting the payment.

5. The method of claim 1, further comprising:

in response to receiving the request to transact the payment between the first user and the second user, selecting, by the one or more processors of the computing device, the payment function service of the node out of a plurality of payment function services at the node to service the request to transact the payment.

6. The method of claim 1, wherein receiving, by the computing device of the edge node of the network and from the external computing device, the request to transact the payment between the first user and the second user further comprises:

communicating, by the payment function service, executing at the one or more processors of the computing device with the external computing device via a wireless network connection.

7. The method of claim 1, wherein the payment is from a first bank account associated with the first user to a second bank account associated with the second user.

8. The method of claim 1, wherein the payment is from a first digital wallet associated with the first user to a second digital wallet associated with the second user.

9. The method of claim 1, wherein the payment comprises cryptocurrency.

10. A computing device at an edge node of a network, the computing device comprising:

memory; and one or more processors in communication with the memory and configured to:

receive, from an external computing device associated with a first user, a request to transact a payment between the first user and a second user;

negotiate with a first plurality of payment function services executing at a first one or more computing devices of a parent payment gateway associated with the first user and with a second plurality of payment function services executing at a second one or more computing devices of a receiving payment gateway associated with the second user to transact the payment between a second payment function service of the parent payment gateway and a third payment function service of the receiving payment gateway, wherein the parent payment gateway and the receiving payment gateway are at nodes of the network; and communicate with the second payment function service and the third payment function service to process the payment, including sending a secure token to at least one of: the second payment function service or the third payment function service for settlement of the payment.

11. The computing device of claim 10, wherein the first plurality of payment function services and the second plurality of payment function services are at a plurality of edge nodes of a network.

12. The computing device of claim 10, wherein to negotiate with the first plurality of payment function services of a parent payment gateway associated with the first user and with the second plurality of payment function services of a receiving payment gateway associated with the second user, the one or more processors are further configured to:

select the third payment function service out of the second plurality of payment function services of the receiving payment gateway based at least in part on a proximity of the third payment function service to a second computing device associated with the second user.

13. The computing device of claim 10, wherein to negotiate with the first plurality of payment function services of a parent payment gateway associated with the first user and with the second plurality of payment function services of a receiving payment gateway associated with the second user, the one or more processors are further configured to:

select the third payment function service out of the second plurality of payment function services of the receiving payment gateway based at least in part on a transaction speed of the third payment function service for transacting the payment.

14. The computing device of claim 10, wherein to receive, from the external computing device, the request to transact the payment between the first user and the second user, the one or more processors are further configured to:

communicate with the external computing device via a wireless network connection.

15. The computing device of claim 10, wherein the payment is from a first bank account associated with the first user to a second bank account associated with the second user.

16. The computing device of claim 10, wherein the payment is from a first digital wallet associated with the first user to a second digital wallet associated with the second user.

17. A non-transitory computer-readable storage medium comprising instructions that, when executed by one or more processors of a computing device of an edge node of a network that includes a payment function service, cause the one or more processors to:

receive, from an external computing device associated with a first user, a request to transact a payment between the first user and a second user;

negotiate with a first plurality of payment function services executing at a first one or more computing devices of a parent payment gateway associated with the first user and with a second plurality of payment function services executing at a second one or more computing devices of a receiving payment gateway associated with the second user to transact the payment between a second payment function service of the parent payment gateway and a third payment function service of the receiving payment gateway, wherein the parent payment gateway and the receiving payment gateway are at nodes of the network; and communicate with the second payment function service and the third payment function service to process the payment, including sending a secure token to at least one of: the second payment function service or the third payment function service for settlement of the payment.

* * * * *